(12) United States Patent
Rao et al.

(10) Patent No.: US 11,755,475 B2
(45) Date of Patent: Sep. 12, 2023

(54) SYSTEM AND METHOD FOR UTILIZING ENHANCED THERMAL TELEMETRY FOR DIFFERENTIAL STORAGE OF DATA ON A MEMORY MODULE

(71) Applicant: DELL PRODUCTS, LP, Round Rock, TX (US)

(72) Inventors: Balaji Bapu Gururaja Rao, Austin, TX (US); Jordan Chin, Austin, TX (US); Stuart Allen Berke, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 341 days.

(21) Appl. No.: 16/778,683

(22) Filed: Jan. 31, 2020

(65) Prior Publication Data
US 2021/0240617 A1   Aug. 5, 2021

(51) Int. Cl.
| G06F 12/08 | (2016.01) |
| G01K 1/02 | (2021.01) |
| G01K 13/00 | (2021.01) |
| G01K 3/00 | (2006.01) |

(52) U.S. Cl.
CPC ............ *G06F 12/08* (2013.01); *G01K 1/026* (2013.01); *G01K 3/005* (2013.01); *G01K 13/00* (2013.01); *G06F 2212/1024* (2013.01)

(58) Field of Classification Search
None
See application file for complete search history.

(56) References Cited

U.S. PATENT DOCUMENTS

| 6,667,925 B2 * | 12/2003 | Kobayashi | G11C 7/04 365/189.11 |
| 2007/0106860 A1 * | 5/2007 | Foster, Sr. | G06F 1/3275 711/170 |
| 2008/0005516 A1 * | 1/2008 | Meinschein | G06F 1/3275 711/E12.006 |
| 2008/0086282 A1 | 4/2008 | Artman et al. | |
| 2009/0125695 A1 | 5/2009 | Rangarajan et al. | |
| 2011/0252180 A1 * | 10/2011 | Hendry | G06F 16/1737 711/3 |
| 2014/0281311 A1 * | 9/2014 | Walker | G06F 3/0631 711/170 |

(Continued)

*Primary Examiner* — Tracy C Chan
(74) *Attorney, Agent, or Firm* — Larson Newman, LLP

(57) ABSTRACT

An information handling system includes first and second memory modules, and a central processing unit. The first memory module includes one or more memory ranks of memory devices, and a first plurality of thermal sensors. The second memory module includes one or more memory ranks of memory devices, and a second plurality of thermal sensors. The central processing unit receives first thermal telemetry data for the first memory module from the first thermal sensors, and second thermal telemetry data for the second memory module from the second thermal sensors. In response to the reception of the first thermal telemetry data, the central processing unit determines a first localized temperature of a first memory rank. In response to the first localized temperature exceeding a threshold temperature, the central processing unit re-maps access of data from the first memory rank to a second memory rank.

20 Claims, 5 Drawing Sheets

(56) References Cited

U.S. PATENT DOCUMENTS

| | | | |
|---|---|---|---|
| 2014/0359242 A1* | 12/2014 | Son | G06F 13/1689 |
| | | | 711/167 |
| 2015/0149700 A1* | 5/2015 | Lucas | G11C 5/141 |
| | | | 711/103 |
| 2016/0124888 A1* | 5/2016 | Gervasi | G06F 13/4068 |
| | | | 710/301 |
| 2016/0276002 A1* | 9/2016 | Lee | G06F 12/06 |
| 2017/0343198 A1* | 11/2017 | Ning | G11C 5/04 |
| 2017/0351308 A1* | 12/2017 | Rangarajan | G11C 7/04 |
| 2020/0279588 A1* | 9/2020 | Lym | G11C 29/028 |

* cited by examiner

SYSTEM AND METHOD FOR UTILIZING ENHANCED THERMAL TELEMETRY FOR DIFFERENTIAL STORAGE OF DATA ON A MEMORY MODULE

FIELD OF THE DISCLOSURE

The present disclosure generally relates to information handling systems, and more particularly relates utilizing enhanced thermal telemetry for differential storage of data on a memory module.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements may vary between different applications. Thus information handling systems may also vary regarding what information is handled, how the information is handled, how much information is processed, stored, or communicated, and how quickly and efficiently the information may be processed, stored, or communicated. The variations in information handling systems allow information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, graphics interface systems, data storage systems, networking systems, and mobile communication systems. Information handling systems may also implement various virtualized architectures. Data and voice communications among information handling systems may be via networks that are wired, wireless, or some combination.

SUMMARY

An information handling system includes first and second memory modules, and a central processing unit. The first memory module includes one or more memory ranks of memory devices, and a first plurality of thermal sensors. The second memory module includes one or more memory ranks of memory devices, and a second plurality of thermal sensors. The central processing unit may receive first thermal telemetry data for the first memory module from the first thermal sensors, and second thermal telemetry data for the second memory module from the second thermal sensors. In response to the reception of the first thermal telemetry data, the central processing unit may determine a first localized temperature of a first memory rank. In response to the first localized temperature exceeding a threshold temperature, the central processing unit may re-map access of data from the first memory rank to a second memory rank.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
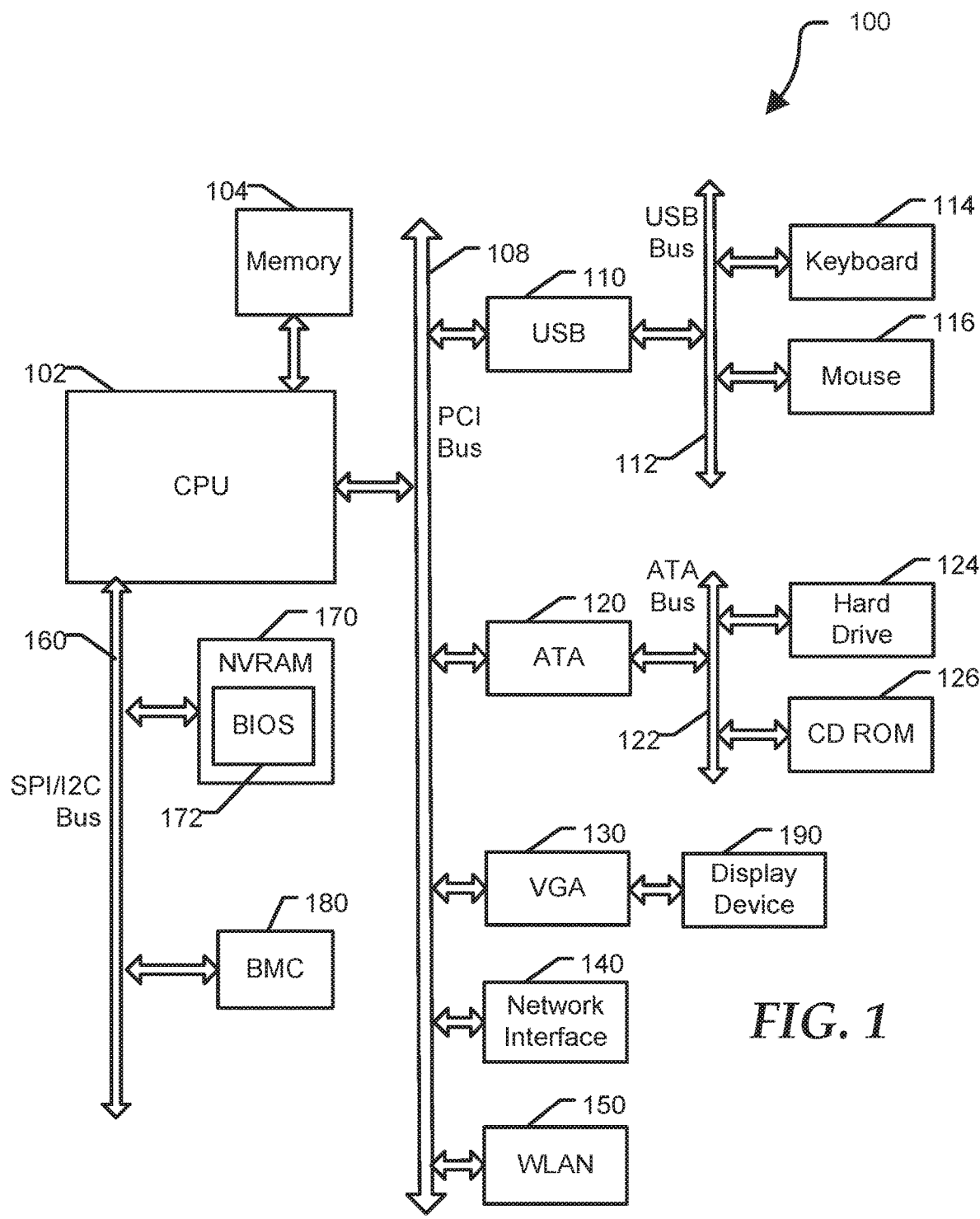
FIG. 1 is a block diagram of a general information handling system according to at least one embodiment of the disclosure.

FIG. 1 illustrates a general information handling system 100 including a processor 102, a memory 104, a PCI bus 108, a universal serial bus (USB) controller 110, a USB bus 112, a keyboard device controller 114, a mouse device controller 116, a configuration an ATA bus controller 120, an ATA bus 122, a hard drive device controller 124, a compact disk read only memory (CD ROM) device controller 126, a video graphics array (VGA) device controller 130, a network interface controller (MC) 140, a wireless local area network (WLAN) controller 150, a serial peripheral interface (SPI) bus 160, a NVRAM 170 for storing BIOS 172, and a baseboard management controller (BMC) 180. In an embodiment, information handling system 100 may be information handling system 300 of FIG. 3. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional buses, not shown for clarity. For example, system 100 can include multiple processor cores, audio devices, and the like. While a particular arrangement of bus technologies and interconnections is illustrated for the purpose of example, one of ordinary skilled in the art will appreciate that the techniques disclosed herein are applicable to other system architectures. System 100 can include multiple CPUs and redundant bus controllers. One or more components can be integrated together. For example, portions of a northbridge/chipset can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. For example, device controller 130 may provide data to a display device 190 to visually present the information to an individual associated with information handling system 100. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

Figure 2:
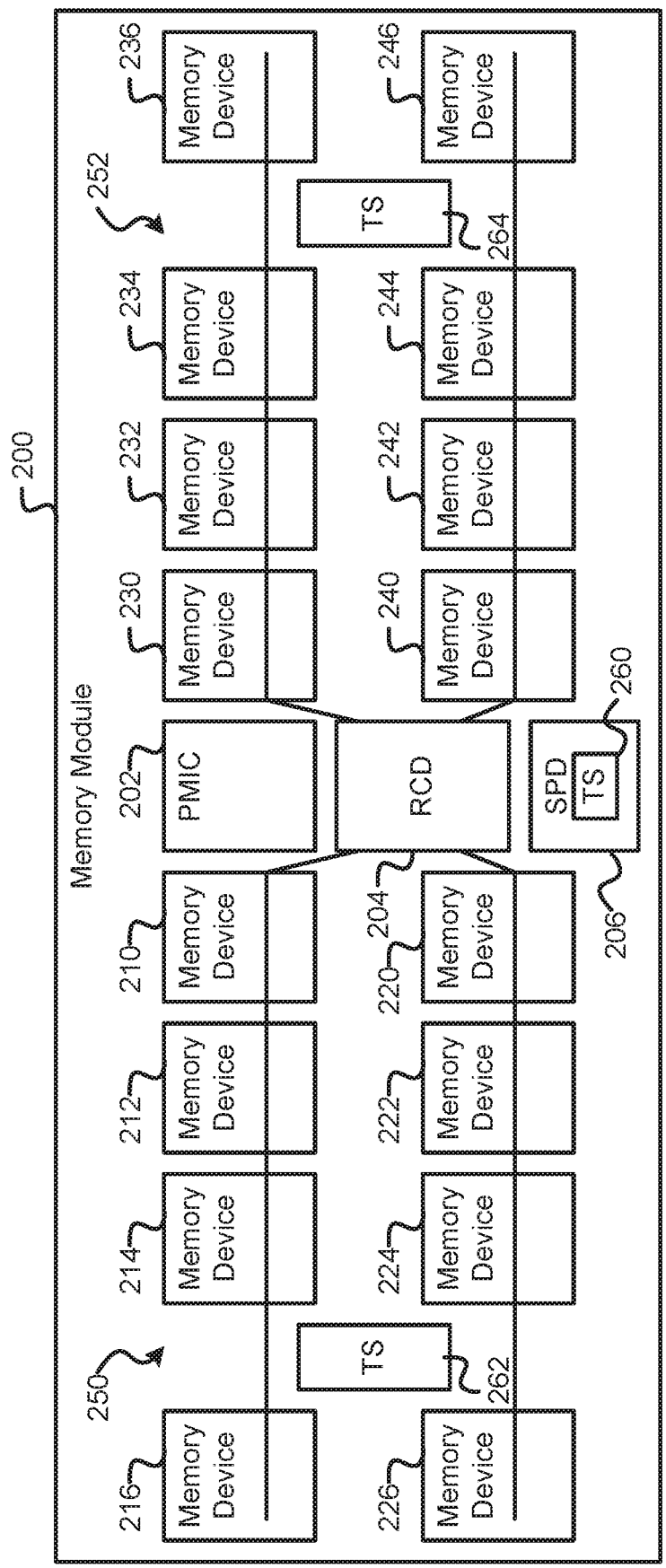
FIG. 2 is a diagram illustrating a dual input memory module according to at least one embodiment of the disclosure.

FIG. 2 illustrates a memory module 200 according to at least one embodiment of the disclosure. Memory module 200 may be substantially similar or any memory module of FIG. 3 including, but not limited to, memory modules 310, 312, 314, 320, 322, and 324. Memory module 200 includes a power management integrated circuit (PMIC) 202, a Registering Clock Driver integrated circuit (RCD) 204, and an electronically erasable programmable read only memory (EEPROM) serial presence detect (SPD) hub 206. Memory module 200 also includes multiple memory devices including, but not limited to, dynamic random access memories (DRAMs) and non-volatile random access memories (NVRAMs), divided into different memory channels and memory ranks. For example, memory devices 210, 212, 214, and 216 (210-216) may be assigned or arranged into a first memory rank of a memory channel 250, and memory devices 220, 222, 224, and 226 (220-226) may be assigned or arranged into a second memory rank of the memory channel 250. Similarly, memory devices 230, 232, 234, and 236 (230-236) may be assigned or arranged into a first memory rank of a memory channel 252, and memory devices 240, 242, 244, and 246 (240-246) may be assigned or arranged into a second memory rank of the memory channel 252. Memory devices 210-216, 220-226, 230-236, and 240-246 on a memory module, such as memory module 210, 212, 214, 220, 222, and 224, may provide data to a memory controller, such as memory controller 304 or 306, via any suitable bus, such as a SDRAM bus, using a known double data rate (DDR), DDR2, DDR3, DDR4, or DDR5 signaling format.

Memory module 200 includes multiple thermal sensors including, but not limited to, a thermal sensor 260 within SPD hub 206, a thermal sensor 262 located in the middle of memory channel 250, and a thermal sensor 264 located in the middle of memory channel 252. In an example, memory module 200 may include additional thermal sensors without varying from the scope of this disclosure, such as a different thermal sensor in each memory device, 210-216, 220-226, 230-236, and 240-246, and a thermal sensor in PMIC 202. In an example, thermal telemetry data from thermal sensors 260, 262, and 264 may be provided, via any suitable device and/or operation, to an operating system (OS) executed on a processor in communication with memory module 200. For example, a baseboard management controller (BMC) may receive the thermal telemetry data from thermal sensors 260, 262, and 264 via a side-band communication bus, such as I3C communication bus, and the BMC may provide the thermal telemetry data to the processor. An information handling system, such as information handling system 100 of FIG. 1 or information handling system 300 of FIG. 3, may utilize the thermal telemetry data to improve the information handling system by optimizing performance of memory modules, such as memory module 200, and reducing power consumption within the information handling system.

Figure 3:
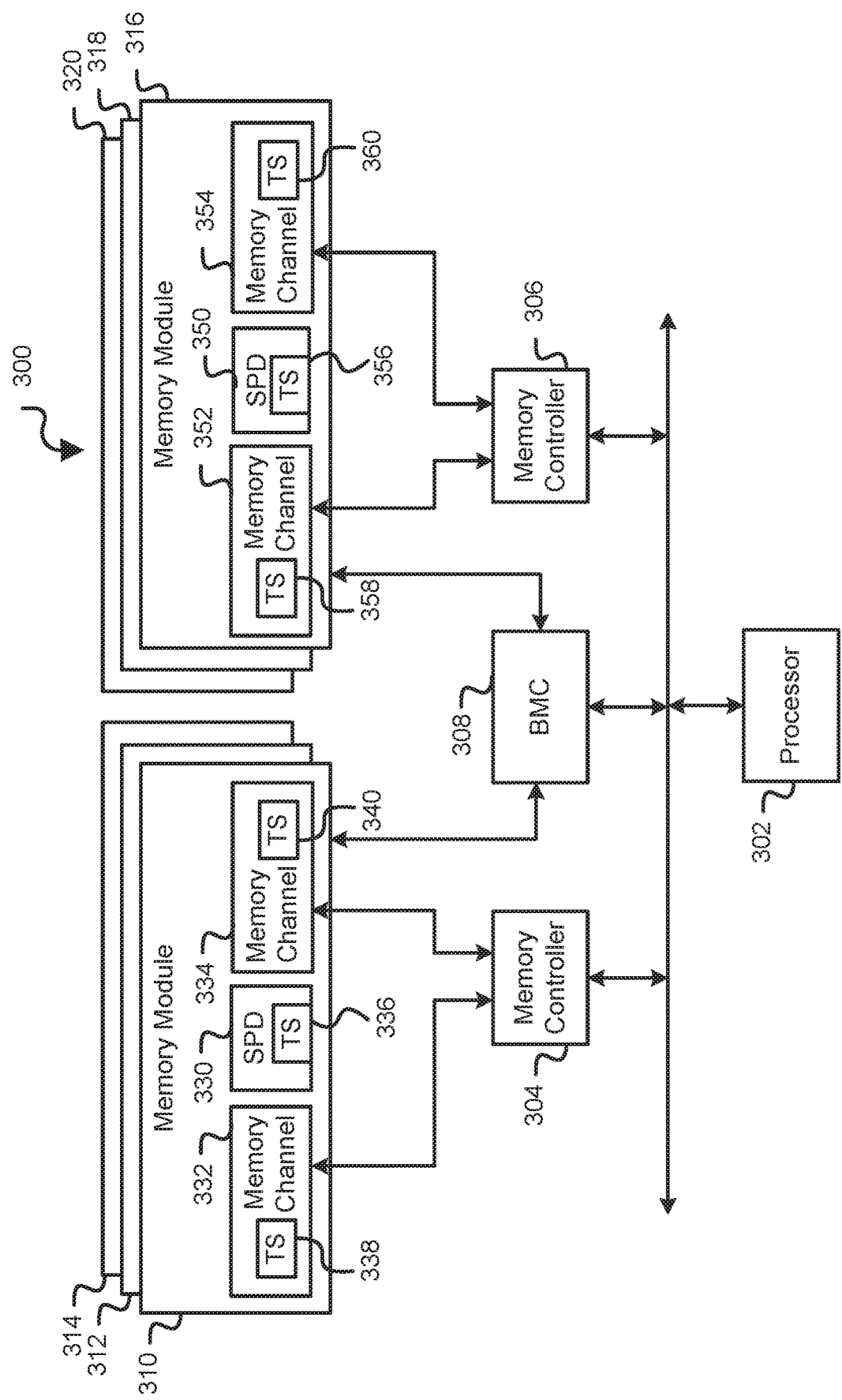
FIG. 3 is a block diagram of a portion of an information handling system according to at least one embodiment of the disclosure.

FIG. 3 is a block diagram of a portion of an information handling system 300 according to at least one embodiment of the disclosure. Information handling system 300 includes a central processing unit (CPU) 302, memory controllers 304 and 306, a BMC 308, memory modules 310, 312, 314, 316, 318, and 320 (310-320), and one or more additional components. Each of memory modules (310-320) may be any suitable type of memory module including, but not limited to, a dual in-line memory module (DIMM). Each memory module 310-320 may include one or more types of memory devices including, but not limited to, DRAMs and NVRAMs. In an example, memory module 310 may include one or more memory devices assigned to one or more memory ranks within memory channel 332 and one or more memory devices assigned to one or more memory ranks within memory channel 334. Similarly, memory module 316 may include one or more memory devices assigned to one or more memory ranks within memory channel 352 and one or more memory devices assigned to one or more memory ranks within memory channel 354. In an example, each memory devices within memory channel 332, 334, 352, and/or 354 may include one or more thermal sensors. In certain examples, the thermal sensors may be located in any suitable location including, but not limited to, a hub of a memory module, in the middle of each memory channel of the memory module, with a PMIC of the memory module, and each DRAM on the memory module. For example, a thermal sensor 336 may be located within SPD hub 330, a thermal sensor 338 may be located in the middle of memory channel 332, and a thermal sensor 340 may be located in the middle of memory channel 334. Similarly, a thermal sensor 356 may be located within SPD hub 350, a thermal sensor 358 may be located in the middle of memory channel 352, and a thermal sensor 360 may be located in the middle of memory channel 354.

Information handling system 300 may be employed, in whole or in part, by information handling system 100 illustrated in FIG. 1, or any other system, device, component, or the like operable to employ portions, or all of, the information handling system. In an example, information handling system 300 may include more components than shown in FIG. 3 without varying from the scope of this disclosure. For example, information handling system 300 may include additional or fewer memory modules and memory modules 310-320 may include additional components over those illustrated for memory modules 310 and 316. In an example, the additional components may include, but are not limited to, additional memory channels, memory devices, and thermal sensors. Additionally, each of memory modules 310-320 may include the components illustrated in memory module 200 of FIG. 2.

During operation, processor 302 may access data, such as read or write data, within any of memory modules 310-320 via any suitable manner. For example, processor 302 may communicate with memory controller 304 to access data of memory devices within memory modules 310, 312, and 314. Similarly, processor 302 may communicate with memory controller 306 to access data of memory devices within memory modules 316, 318, and 320. In an example, memory controller 304 may periodically provide refresh commands to the memory devices within memory modules 310, 312, and 314 to recharge capacitors within the memory devices. Similarly, memory controller 306 may periodically provide refresh commands to the memory devices within memory modules 316, 318, and 320 to recharge capacitors within the memory devices.

The refresh commands may be utilized to ensure the proper bit state, such as a 0 or 1, in the bit cells of the memory devices. In an example, a rate of the periodic transmission of the refresh commands may depend on the temperature of the memory device being refreshed. For example, if the temperature of a particular memory device is below a threshold temperature, memory controller 304 or 306 may provide the refresh commands to the particular memory device or devices at a first rate, such as a 1× refresh rate. However, if the temperature of a particular memory device exceeds a threshold temperature, memory controller 304 or 306 may provide the refresh command to the particular memory device or devices at a second rate, such as a 2× refresh rate. In situations where the refresh rate is the 2× refresh rate, memory controller 304 or 306 may utilize the bandwidth available to a memory module to provide the increased number of refresh commands instead of providing read or write commands, such that performance of the memory module may decrease. Additionally, the increase of temperature within the memory module may result in higher power consumption within information handling system 300 because the memory modules consume more intrinsic power due to the doubled rate of refresh commands and cooling fans may be run at higher speeds to provide more cooling to the memory modules. Thus, processor 302 and/or memory modules 304 and 306 may improve information handling system 300 by utilizing thermal telemetry data from memory modules 310-320 to control data storage within the memory modules.

In an example, the operations of information handling system 300 may be performed with respect to all of memory modules 310-320. However, for brevity and clarity the operations of components within information handling system 300 will be described only with respect to memory modules 310 and 316.

In an example, processor 302 may write data to or read data from one or more of the memory devices within memory channels 332 and 334 of memory module 310 via memory controller 304. Similarly, processor 302 may write data to or read data from one or more of the memory devices within memory channels 352 and 354 of memory module 316 via memory controller 306. As stated above, the memory devices within each of memory channels 332, 334, 352, and 354 may be assigned or allocated in one or two memory ranks per memory channel. In an example, processor 302 may assign or map any suitable number of memory ranks as spare memory ranks, such that data is not written to or read from the memory devices of the spare memory ranks. In an embodiment, the one or more spare memory ranks are utilized to maintain the temperatures of all of the memory devices within information handling system 300 at temperatures below the threshold temperature.

While processor 302 is accessing data within one or more of memory channels 332, 334, 352, and 354, BMC 308 may periodically retrieve thermal telemetry data from thermal sensors 336, 338, 340, 356, 358, and 360 via any suitable communication bus. For example, BMC 308 may receive the thermal telemetry data via a side-band communication bus, such as I3C communication bus. BMC 308 may provide the thermal telemetry data to processor 302 and/or memory controllers 304 and 306, which in turn may utilize the thermal telemetry data to determine whether data within memory devices of a particular memory rank should be re-mapped to memory devices of one of the spare memory ranks. In an example, processor 302 may poll thermal sensors 336, 338, 340, 356, 358, and 360, via any suitable communication bus, to receive the thermal telemetry data directly from the thermal sensors.

Thus, processor 302 may receive the thermal telemetry data from BMC 308 or directly from thermal sensors 336, 338, 340, 356, 358, and 360. In response to the reception of the thermal telemetry data, processor 302 may determine one or more localized temperatures of memory devices within memory ranks of memory channels 332, 334, 352, and 354. Processor 302 may determine or calculate the localized temperatures via any suitable manner. For example, processor 302 may utilize the thermal telemetry data from thermal sensor 336 and thermal sensor 338 to determine or calculate the localized temperature of memory devices within the memory ranks of memory channel 332. Similarly, processor 302 may utilize the thermal telemetry data from thermal sensor 336 and thermal sensor 340 to determine or calculate the localized temperature of memory devices within the memory ranks of memory channel 334. Additionally, processor 302 may utilize the thermal telemetry data from thermal sensor 356 and thermal sensor 358 to determine or calculate the localized temperature of memory devices within the memory ranks of memory channel 352. Also, processor 302 may utilize the thermal telemetry data from thermal sensor 356 and thermal sensor 360 to determine or calculate the localized temperature of memory devices within the memory ranks of memory channel 354.

In response to determining the localized temperatures of the memory devices within the memory ranks of memory channels 332, 334, 352, and 354, processor 302 may determine whether one or more of the localized temperatures exceed a threshold temperature. In an example, the threshold temperature utilized for comparison with the localized temperatures may be lower than the temperature at which the refresh rate for the memory devices is increased so that a re-mapping of the data may occur before an increased refresh rate is initialized. In response to a localize temperature of memory devices in a particular memory rank of a memory channel, such as memory channel 332, exceeding the threshold temperature, processor 302 may perform one or more operations to re-map the data stored in and access to the particular memory rank of memory channel 332 to a spare memory rank.

In an example, if the spare memory rank is within memory channel 332 or 334, such that the spare memory rank is within the same memory module 310 as the memory rank with the localize temperature exceeding the threshold temperature, processor 302 may provide one or more suitable command signals to memory controller 304 to re-map the data to the spare memory rank. However, if the spare memory rank is within memory channel 352 or 354, such that the spare memory rank is within a different memory module 316 as the memory rank with the localize temperature exceeding the threshold temperature, the OS executed on processor 302 may provide one or more suitable command signals to locally re-map the data to the spare memory rank.

In an example, the re-mapping of the data to the spare memory rank may provide one or more improvements to information handling system 300. For example, the re-mapping of the data to the spare memory rank may enable the localized temperature of the hot memory rank, such as a memory rank within memory channel 332, to reduce and thereby remain under the threshold temperature. Additionally, the re-mapping of the data to the spare memory rank may allow the data to be accessed in the re-mapped memory rank without the refresh rate being increased from a default refresh rate. Thus, the performance of memory module 310-320 may be optimized based on the re-mapping of data in response to the thermal telemetry data from thermal sensors of the memory modules.

In an example, memory controllers 304 and 306 may perform the operations described above for processor 302 to monitor thermal telemetry data, determine or calculate localized temperatures, and re-map data from memory devices of a particular memory rank to a spare memory rank. However, memory controllers 304 and 306 may only perform these operations with respect to thermal telemetry data and memory devices for the memory modules in communication with each particular memory controller because a memory controller only has access to those particular memory devices. For example, memory controller 304 may perform these operations for memory devices on memory modules 310-314, and memory controller 306 may perform these operations for memory devices on memory module 316-320.

Figure 4:
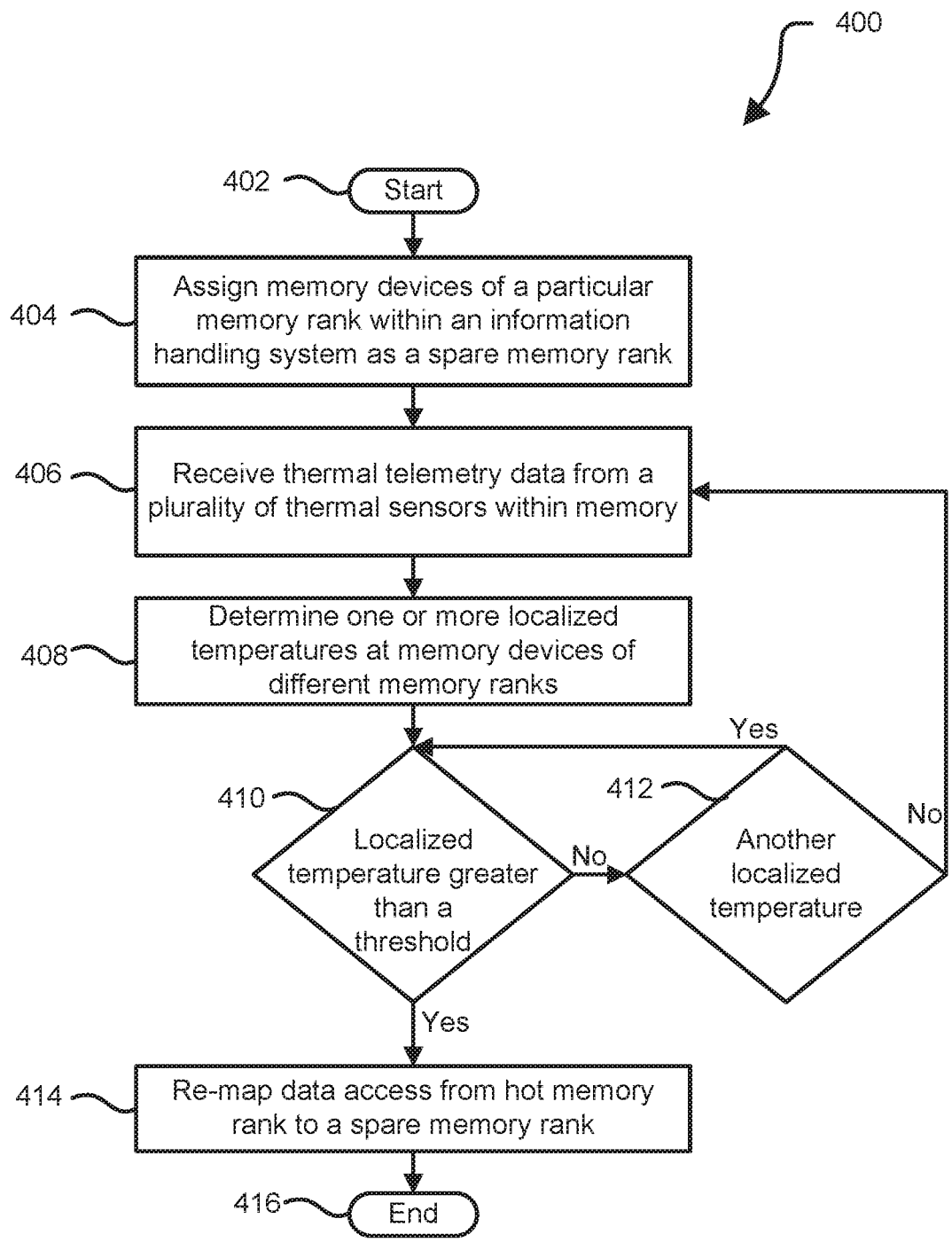
FIG. 4 is a flow diagram illustrating a method for utilizing thermal telemetry data to provide differential storage of data on a memory module according to at least one embodiment of the disclosure.

FIG. 4 is a flow diagram illustrating a method 400 for utilizing thermal telemetry data to provide differential storage of data on a memory module according to at least one embodiment of the disclosure, starting at block 402. It will be readily appreciated that not every method step set forth in this flow diagram is always necessary, and that certain steps of the methods may be combined, performed simultaneously, in a different order, or perhaps omitted, without varying from the scope of the disclosure. FIG. 4 may be employed in whole, or in part, by information handling system 100 depicted in FIG. 1, information handling system 300 described in FIG. 3, or any other type of system, controller, device, module, processor, or any combination thereof, operable to employ all, or portions of, the method of FIG. 4.

At block 404, memory devices of a particular memory rank within an information handling system are assigned as a spare memory rank. In an example, memory devices of a spare memory rank may be any memory devices assigned to a particular memory rank that is not currently allocated for data storage within the information handling system. In an example, the memory devices may be any suitable device including, but not limited to, a non-volatile random access memories (NVRAMs) and dynamic random access memories (DRAMs). In certain examples, the memory module may include multiple memory ranks, and multiple memory channels. In an example, the information handling system may include any number of memory controllers including, but not limited to, one, two, three, or four memory controllers, and each memory controller may communicate with one or more memory modules.

At block 406, thermal telemetry data is received from a plurality of thermal sensors within the information handling system. In an example, each memory module within the information handling system may include any suitable number of thermal sensors, and the thermal sensors may be located at any suitable location within the memory module. For example, the thermal sensors may be located in a SPD hub in the center of the memory modules, in the middle of each memory channel of the memory module, or the like. In an example, the thermal telemetry may be read by any suitable device including, but not limited to, a baseboard management controller and a memory controller. In an embodiment, the baseboard management controller reads the thermal telemetry data via a side-band communication channel, such as an I3C communication channel.

At block 408, one or more localized temperatures at memory devices of different memory ranks are determined. In an example, different localized temperatures for each memory rank within the information handling system may be monitored and determined.

At block 410, a determination is made whether one of the localized temperatures is greater than a threshold temperature. In an example, the threshold temperature may be any temperature value of memory devices that when exceeded, the refresh data rate is increased by the memory controller. For example, if the temperature of memory devices of a particular memory rank exceeds the threshold temperature, the refresh rate for those memory devices may be increased from a 1× refresh rate to a 2× refresh rate. If a first localized temperature has not exceeded the threshold temperature, a determination is made whether another localized temperature should be compared to the threshold temperature at block 412. If another localized temperature is left to be compared, the flow continues as stated above at block 410. Otherwise, the flow continues as stated above at block 406. If, at block 410, a localized temperature has exceeded the threshold temperature, the flow continues at block 414.

At block 414, data access is re-mapped from the memory devices of the hot memory rank to memory devices of the spare memory rank, and the method ends at block 416. In different examples, the switching of the data access from the first memory devices of the first memory rank to memory devices of a spare memory rank may be performed in any suitable manner. For example, if the memory devices of the spare memory rank are located on the same memory module as the first memory devices of the first memory rank, a memory controller in communication with the memory module may re-map memory allocations from the first memory devices of the first memory rank to the memory devices of the spare memory rank. Additionally, if the memory devices of the spare memory rank are located on a different memory module as the first memory devices of the first memory rank but both memory modules are connected to the same memory controller, the memory controller, or an OS executed by a processor in communication with the memory controller, may re-map memory allocations from the first memory devices of the first memory rank to the memory devices of the spare memory rank. If the memory devices of the spare memory rank are located on a different memory module as the first memory devices of the first memory rank and each of the memory modules are connected to a different memory controller, an OS executed by a processor, in communication with both of the memory controllers, may re-map memory allocations from the first memory devices of the first memory rank to the memory devices of the spare memory rank.

Figure 5:
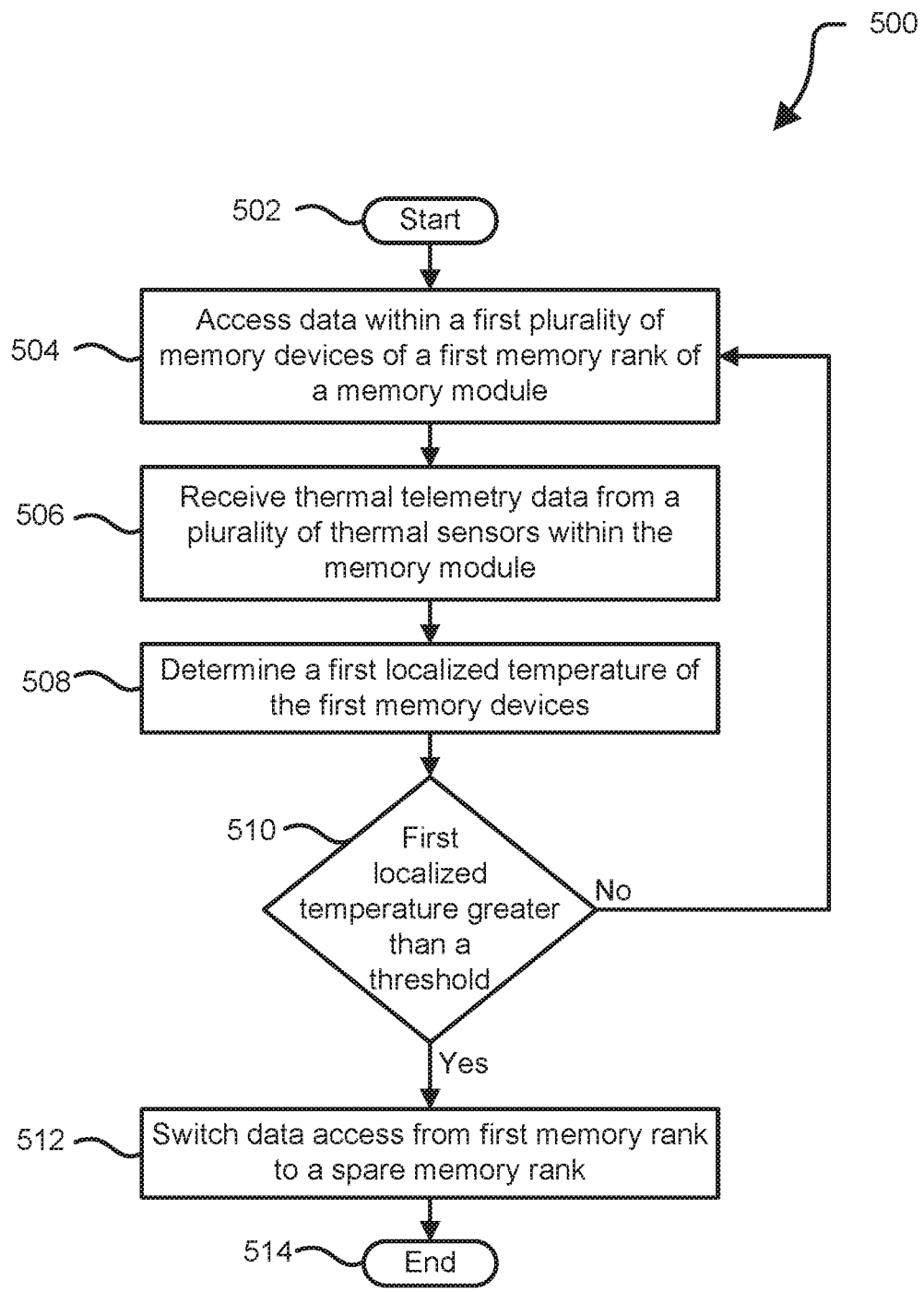
FIG. 5 is a flow diagram illustrating a method for utilizing thermal telemetry data to provide differential storage of data on a memory module according to at least one embodiment of the disclosure.

FIG. 5 is a flow diagram illustrating a method 500 for utilizing thermal telemetry data to provide differential storage of data on a memory module according to at least one embodiment of the disclosure, starting at block 502. It will be readily appreciated that not every method step set forth in this flow diagram is always necessary, and that certain steps of the methods may be combined, performed simultaneously, in a different order, or perhaps omitted, without varying from the scope of the disclosure. FIG. 5 may be employed in whole, or in part, by information handling system 100 depicted in FIG. 1, information handling system 300 described in FIG. 3, or any other type of system, controller, device, module, processor, or any combination thereof, operable to employ all, or portions of, the method of FIG. 5.

At block 504, data is accessed within a first plurality of memory devices of a first memory rank of a memory module of an information handling system. In an example, the memory devices may be any suitable device including, but not limited to, a non-volatile random access memories (NVRAMs) and dynamic random access memories (DRAMs). In certain examples, the memory module may include multiple memory ranks including the first memory rank. In an example, the information handling system may include any number of memory controllers including, but not limited to, one, two, three, or four memory controllers, and each memory controller may communicate with one or more memory modules.

At block 506, thermal telemetry data is received from a plurality of thermal sensors within the memory module. In an example, the memory module may include any suitable number of thermal sensors, and the thermal sensors may be located at any suitable location within the memory module. For example, the thermal sensors may be located in a SPD hub in the center of the memory modules, in the middle of each memory channel of the memory module, or the like. In an example, the thermal telemetry may be read by any suitable device including, but not limited to, a baseboard management controller and a memory controller. In an embodiment, the baseboard management controller reads the thermal telemetry data via a side-band communication channel, such as an I3C communication channel.

At block 508, a first localized temperature for memory devices is determined. In an example, the first memory devices may be memory devices of any particular memory rank within any particular memory module of the information handling system. In an example, different localized temperatures for each memory rank within the information handling system may be monitored and determined, such that any of the different localized temperatures may be the first localized temperature.

At block 510, a determination is made whether the first localized temperature is greater than a threshold temperature. In an example, the threshold temperature may be any temperature value of memory devices that when exceeded, the refresh data rate is increased by the memory controller.

For example, if the temperature of memory devices of a particular memory rank exceeds the threshold temperature, the refresh rate for those memory devices may be increased from a 1× refresh rate to a 2× refresh rate. If the first localized temperature has not exceeded the threshold temperature, the flow continues as stated above at block 504. If the first localized temperature has exceeded the threshold temperature, the flow continues at block 512.

At block 512, data access is switched from the first memory devices of the first memory rank to memory devices of a spare memory rank, and the method ends at block 514. In an example, memory devices of a spare memory rank may be any memory devices assigned to a particular memory rank that is not currently allocated for data storage within the information handling system. In different examples, the switching of the data access from the first memory devices of the first memory rank to memory devices of a spare memory rank may be performed in any suitable manner. For example, if the memory devices of the spare memory rank are located on the same memory module as the first memory devices of the first memory rank, a memory controller in communication with the memory module may re-map memory allocations from the first memory devices of the first memory rank to the memory devices of the spare memory rank. Additionally, if the memory devices of the spare memory rank are located on a different memory module as the first memory devices of the first memory rank but both memory modules are connected to the same memory controller, the memory controller, or an OS executed by a processor in communication with the memory controller, may re-map memory allocations from the first memory devices of the first memory rank to the memory devices of the spare memory rank. If the memory devices of the spare memory rank are located on a different memory module as the first memory devices of the first memory rank and each of the memory modules are connected to a different memory controller, an OS executed by a processor, in communication with both of the memory controllers, may re-map memory allocations from the first memory devices of the first memory rank to the memory devices of the spare memory rank.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module may include software, including firmware embedded at a processor or software capable of operating a relevant environment of the information handling system. The device or module may also include a combination of the foregoing examples of hardware or software. Note that an information handling system may include an integrated circuit or a board-level product having portions thereof that may also be any combination of hardware and software.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising:
   a first memory module including:
      one or more memory ranks of memory devices;
      a first serial presence detect hub; and
      a first plurality of thermal sensors including a first thermal sensor within the first serial presence detect hub, and a second thermal sensor in a first memory channel of the first memory module;
   a second memory module including:
      one or more memory ranks of memory devices;
      a second serial presence detect hub; and
      a second plurality of thermal sensors including a third thermal sensor within the second serial presence detect hub, and a fourth thermal sensor in a second memory channel of the second memory module; and
   a central processing unit to communicate with the first and second memory modules, the central processing unit to receive first thermal telemetry data for the first memory module from the first and second thermal sensors, to receive second thermal telemetry data for the second memory module from the third and fourth thermal sensors, in response to the reception of the first thermal telemetry data, to determine a first localized temperature of a first memory rank, and in response to the first localized temperature exceeding a threshold temperature, to re-map access of data from the first memory rank to a second memory rank, wherein the central processing unit causes a first memory controller to perform the re-mapping when the first and second memory ranks are located on a same memory module, wherein an operating system performs the re-mapping when the first and second memory ranks are located on different memory modules, wherein the threshold temperature is a temperature that when exceeded causes a refresh data rate for the first memory rank to be increased.

2. The information handling system of claim 1, in response to the reception of the second thermal telemetry data, the central processing unit to determine a second localized temperature of the second memory rank, to determine that the second localized temperature is below the threshold temperature, and to identify the second memory rank as a spare memory rank.

3. The information handling system of claim 1, further comprising:
the first memory controller to communicate with the first memory module and with the central processing unit, the memory controller to receive a control signal from the central processing unit, in response to reception of the control signal, the memory controller to perform the re-map of the access of data from the first memory rank to the second memory rank.

4. The information handling system of claim 1, further comprising:
the first memory controller to communicate with the first memory module and with the central processing unit; and
a second memory controller to communicate with the second memory module and with the central processing unit,
the central processing unit to provide a first control signal to the first memory controller and a second control signal to the second memory controller, wherein the first and second control signals cause the first and second memory controller to perform the re-map of the access of data from the first memory rank within the first memory module to the second memory rank within the second memory module.

5. The information handling system of claim 1, further comprising:
an electronically erasable programmable read only memory to communicate with the central processing unit; and
a thermal sensor located within the electronically erasable programmable read only memory, the thermal sensor to measure a temperature of the memory module at the electronically erasable programmable read only memory,
the central processing unit to determine the first localized temperature based on the temperature of the memory module at the electronically erasable programmable read only memory.

6. The information handling system of claim 1, further comprising:
the first thermal sensor located in between memory ranks of the first channel of the memory devices, the first thermal sensor to measure a first temperature of the memory module at the first channel; and
the second thermal sensor located in between memory ranks of the second channel of the memory devices, the second thermal sensor to measure a second temperature of the memory module at the second channel,
the central processing unit to determine the first localized temperature based on the first and second temperatures.

7. The information handling system of claim 1, wherein the first memory rank and the second memory rank are both located on the first memory module.

8. The information handling system of claim 1, wherein the first memory rank is located on the first memory module and the second memory rank is located on the second memory module.

9. A method, comprising:
accessing, via a first memory controller, data within a first plurality of memory devices of a first memory rank within a first memory module of an information handling system;
receiving, by a central processing unit, thermal telemetry data from a plurality of thermal sensors within the first memory module, the thermal sensors including a first thermal sensor within a first serial presence detect hub of the first memory module, and a second thermal sensor in a first memory channel of the first memory module;
in response to the reception of the thermal telemetry data, determining a first localized temperature of the first memory devices of the first memory rank; and
in response to the first localized temperature exceeding a threshold temperature, re-mapping access of data from the first memory devices of the first memory rank to a second plurality of memory devices of a second memory rank, wherein the central processing unit causes a first memory controller to perform the re-mapping when the first and second memory ranks are located on a same memory module, wherein an operating system executed the re-mapping when the first and second memory ranks are located on different memory modules, wherein the threshold temperature is a temperature that when exceeded causes a refresh data rate for the first memory rank to be increased, wherein the second memory rank is a spare memory rank within the information handling system.

10. The method of claim 9, wherein the re-mapping of the data from the first memory devices of the first memory rank to the second plurality of memory devices of the second memory rank further comprises:
receiving, by the first memory controller, a control signal from the central processing unit; and
in response to the receiving of the control signal, re-mapping, by the first memory controller, the access of data from the first memory rank to the second memory rank.

11. The method of claim 9, wherein the re-mapping of the access of data from the first memory rank to the second memory rank further comprises:
providing a first control signal to the first memory controller;
providing a second control signal to a second memory controller; and
in response to the first and second control signals, performing, by the first and second memory controller, the re-mapping of the access of data from the first memory rank to the second memory rank.

12. The method of claim 11, wherein the first memory rank is located on the first memory module and the second memory rank is located on the second memory module.

13. The method of claim 9, further comprising:
receiving, by the central processing unit and from a thermal sensor located within an electronically erasable programmable read only memory of the memory module, a temperature of the memory module at the electronically erasable programmable read only memory; and
determining, by the central processing unit and based on the temperature of the memory module at the electronically erasable programmable read only memory, a localized temperature of the memory module.

14. The method of claim 9, further comprising:
receiving, by the central processing unit from the first thermal sensor located in between memory ranks of the first channel of the memory devices, a first temperature of the memory module at the first channel of the memory module;
receiving, by the central processing unit from the second thermal sensor located in between memory ranks of the second channel of the memory devices, a second temperature of the memory module at the second channel of the memory module; and
determining, by the central processing unit and based on the first and second temperatures, different localized temperatures of the memory module.

15. The method of claim 9, further comprising:
receiving, by the central processing unit, a second localized temperature of the second memory rank;
determining that the second localized temperature is below the threshold temperature; and
identifying the second memory rank as the spare memory rank.

16. The method of claim 9, wherein the first memory rank and the second memory rank are both located on the first memory module.

17. An information handling system, comprising:
a first memory module including:
one or more memory ranks of memory devices;
a first serial presence detect hub; and
a first plurality of thermal sensors including a first thermal sensor within the first serial presence detect hub, and a second thermal sensor in a first memory channel of the first memory module;
a second memory module including:
one or more memory ranks of memory devices;
a second serial presence detect hub; and
a second plurality of thermal sensors including a third thermal sensor within the second serial presence detect hub, and a fourth thermal sensor in a second memory channel of the second memory module; and
a memory controller to communicate with the first and second memory modules, the central processing unit to receive first thermal telemetry data for the first memory module from first and second thermal sensors, to receive second thermal telemetry data for the second memory module from the third and fourth thermal sensors, in response to the reception of the first thermal telemetry data, to determine a first localized temperature of a first memory rank, and in response to the first localized temperature exceeding a threshold temperature, to re-map access of data from the first memory rank to a second memory rank, wherein the central processing unit causes a memory controller to perform the re-mapping when the first and second memory ranks are located on a same memory module, wherein an operating system performs the re-mapping when the first and second memory ranks are located on different memory modules, wherein the threshold temperature is a temperature that when exceeded causes a refresh data rate for the first memory rank to be increased.

18. The information handling system of claim 17, further comprising:
the first thermal sensor located in in between memory ranks of the first channel of the memory devices, the first thermal sensor to measure a first temperature of the memory module at the first channel; and
the second thermal sensor located in in between memory ranks of the second channel of the memory devices, the second thermal sensor to measure a second temperature of the memory module at the second channel,
the memory controller to determine the first localized temperature based on the first and second temperatures.

19. The information handling system of claim 17, wherein the first memory rank and the second memory rank are both located on the first memory module.

20. The information handling system of claim 17, wherein the first memory rank is located on the first memory module and the second memory rank is located on the second memory module.

* * * * *